(12) United States Patent
Yamazaki et al.

(10) Patent No.: US 8,965,266 B2
(45) Date of Patent: Feb. 24, 2015

(54) AUTOMATIC DOCUMENT FEEDER HAVING LATCHING MECHANISM FOR TRANSPORT PATH ACCESS

(75) Inventors: Akira Yamazaki, Kanagawa (JP); Hyundeok Ha, Kanagawa (JP); Senggyu Cho, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 98 days.

(21) Appl. No.: 13/453,372

(22) Filed: Apr. 23, 2012

(65) Prior Publication Data

US 2013/0089365 A1    Apr. 11, 2013

(30) Foreign Application Priority Data

Oct. 5, 2011    (JP) .................................. 2011-221372

(51) Int. Cl.
| | |
|---|---|
| G03G 15/00 | (2006.01) |
| B65H 5/06 | (2006.01) |
| H04N 1/00 | (2006.01) |
| H04N 1/12 | (2006.01) |
| H04N 1/193 | (2006.01) |
| H04N 1/203 | (2006.01) |

(52) U.S. Cl.
CPC .............. B65H 5/062 (2013.01); H04N 1/00 (2013.01); H04N 1/00543 (2013.01); B65H 2402/441 (2013.01); B65H 2402/5155 (2013.01); B65H 2404/6111 (2013.01); B65H 2801/06 (2013.01); B65H 2801/39 (2013.01); H04N 1/00567 (2013.01); H04N 1/12 (2013.01); H04N 1/193 (2013.01); H04N 1/2032 (2013.01)
USPC ........... 399/367; 399/372; 399/373; 399/374; 399/379; 399/380; 399/107; 399/110; 399/124; 399/125; 399/365; 358/496; 358/497; 358/498; 358/474; 400/691; 400/692; 400/693

(58) Field of Classification Search
USPC .............. 399/107, 110, 124, 125, 365, 367, 399/372–374, 379–380; 358/496–498, 474; 400/691, 692, 693
See application file for complete search history.

(56) References Cited

U.S. PATENT DOCUMENTS

| | | | |
|---|---|---|---|
| 7,623,276 B2 * | 11/2009 | Hiraoka et al. | ............... 358/498 |
| 7,804,628 B2 * | 9/2010 | Hashimoto et al. | ........... 358/494 |
| 2006/0098250 A1 | 5/2006 | Ito et al. | |

FOREIGN PATENT DOCUMENTS

| | | |
|---|---|---|
| JP | A-2005-91794 | 4/2005 |
| JP | B2-4331668 | 9/2009 |

\* cited by examiner

*Primary Examiner* — Matthew G Marini
*Assistant Examiner* — Quang X Nguyen
(74) *Attorney, Agent, or Firm* — Oliff PLC (57) ABSTRACT

Automatic document feeder includes a transport path member having a transport path surface configuring a transport path in a device body, a latching member that is mounted on a rotating shaft provided in the other end side, is urged in a first rotation direction latched to a latched portion, and holds the transport path member in closed transport path, and an operating member that is rotated up to an operating position by own weight thereof or urging force in a second rotation direction when the device body moves to an exposed position of the transport path member, and is mounted with allowance so that the latching member is rotated in the second rotation direction according to a further rotating operation in the second rotation direction from the operating position and the latching member is detached from the latched portion.

3 Claims, 9 Drawing Sheets

AUTOMATIC DOCUMENT FEEDER HAVING LATCHING MECHANISM FOR TRANSPORT PATH ACCESS

CROSS-REFERENCE TO RELATED APPLICATIONS

This application is based on and claims priority under 35 USC 119 from Japanese Patent Application No. 2011-221372 filed Oct. 5, 2011.

BACKGROUND

1. Technical Field

The present invention relates to an automatic document feeder.

2. SUMMARY

According to an aspect of the invention, there is provided an automatic document feeder including a transport path member that includes a transport path surface configuring a transport path in which a document is transported in a device body, of which one end side is supported so as to rotate in the device body and the other end side moves in a direction separated from the device body to open the transport path, a latching member that is mounted on a rotating shaft provided in the other end side of the transport path member, is urged in a first rotation direction latched to a latched portion of the device body, and holds the transport path member in a closed state of the transport path by being latched to the latched portion, and an operating member that is rotated up to an operating position by own weight thereof or urging force in a second rotation direction opposed to the first rotation direction when the device body moves to an exposed position in which the transport path member is exposed, and is mounted with allowance in a circumferential direction of the rotating shaft so that the latching member is rotated in the second rotation direction according to a further rotating operation in the second rotation direction from the operating position and the latching member is detached from the latched portion.

BRIEF DESCRIPTION OF THE DRAWINGS

Exemplary embodiments of the present invention will be described in detail based on the following figures, wherein.

DETAILED DESCRIPTION

Hereinafter, an exemplary embodiment according to the present invention will be described in detail with reference to drawings. Moreover, for the sake of convenience of explanation, an arrow UP shown in FIG. 1 indicates the upward direction of an image forming apparatus 100. In addition, in the following, the up and down directions are represented based on a state where an automatic document feeder 12 closes a first platen glass 72 and a second platen glass 74. The image forming apparatus 100 according to the present exemplary embodiment includes an image recording apparatus 110 which records image on a recording medium P such as paper and an image reading apparatus 10 which reads image of a document.

Figure 1:
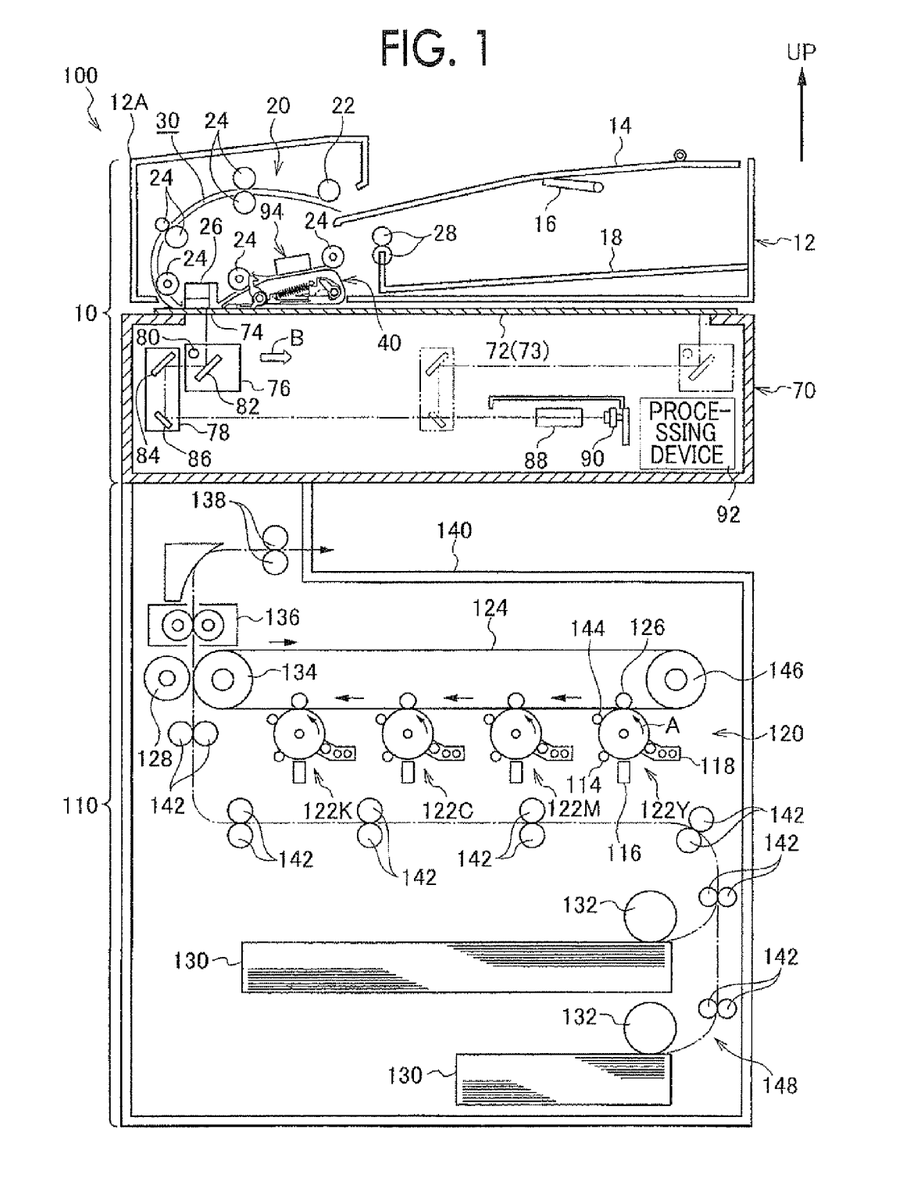
FIG. 1 is a schematic view showing a configuration of an image forming apparatus which includes an automatic document feeder according to the present exemplary embodiment.

The image reading apparatus 10 is disposed on the upper side of the image forming apparatus 100, reads the image of the document, and converts the read image into an image signal. The image recording apparatus 110 is disposed at the lower side of the image forming apparatus 100 and may record the image on the recording medium P based on the image signal which is converted by the image reading apparatus 10. First, a configuration of the image recording apparatus 110 will be described.

The image recording apparatus 110 includes plural recording medium accommodating units 130 in which the recording medium P, such as paper having different sizes, is accommodated, an image forming section 120 which forms a toner image on the recording medium P, a transport unit 148 which transports the recording medium P from the recording medium accommodating units 130 to the image forming section 120, a fixing device 136 which fixes the toner image formed by the image forming section 120 on the recording medium P, and a recording medium discharging unit 140 which discharges the recording medium P in which the toner image is fixed by the fixing device 136.

The image forming section 120 includes image forming units 122Y, 122M, 122C, and 122K in which the toner image of each of yellow (Y), magenta (M), cyan (C), and black (K) is formed, an intermediate transfer belt 124 which is an example of an intermediate transfer member to which the toner image formed by the image forming units 122Y, 122M, 122C, and 122K is transferred, a primary transfer roll 126 which is an example of a primary transfer member which transfers the toner image formed by the image forming units 122Y, 122M, 122C, and 122K to the intermediate transfer belt 124, and a secondary transfer roll 128 which is an example of a secondary transfer member transferring the toner image transferred to the intermediate transfer belt 124 on the recording medium P.

The image forming units 122Y, 122M, 122C, and 122K each includes a photoconductor drum 112 which is an image holding member holding the formed image and is rotated in one direction (direction of arrow A shown in FIG. 1).

In the periphery of each photoconductor drum 112, from the upstream side in the rotation direction of the photoconductor drum 112, a charging device 114 which charges the photoconductor drum 112, an exposure device 116 which exposures the discharged photoconductor drum 112 and forms an electrostatic latent image on the photoconductor drum 112, a developing device 118 which develops the electrostatic latent image formed on the photoconductor drum 112 and forms a toner image, and a removing device 144 which removes the toner remaining on the surface of the photoconductor drum 112 after the toner image is transferred to the intermediate transfer belt 124 are provided in the above order.

The intermediate transfer belt 124 is supported by an opposing roll 134 which is opposed to the secondary transfer roll 128 and a support roll 146, and is circulated and moves in one direction (clockwise direction in FIG. 1) while contacting the photoconductor drum 112.

The primary transfer roll 126 is opposed to the photoconductor drum 112 while interposing the intermediate transfer belt 124. A primary transfer position, in which the toner image formed on the photoconductor drum 112 is primarily transferred to the intermediate transfer belt 124, is formed between the primary transfer roll 126 and the photoconductor drum 112.

The secondary transfer roll 128 is opposed to the opposing roll 134 while interposing the intermediate transfer belt 124. A secondary transfer position, in which the toner image primarily transferred to the intermediate transfer belt 124 is secondarily transferred to the recording medium P, is formed between the secondary transfer roll 128 and the opposing roll 134.

The transport unit 148 includes a feeding roll 132 which feeds the recording medium P accommodated in the recording medium accommodating unit 130 and a transport roll pair 142 which transports the recording medium P fed by the feeding roll 132 to the secondary transfer position.

The fixing device 136 is disposed further to the downstream side in the transport direction than the second transfer position and fixes the toner image transferred by the secondary transfer position on the recording medium P. A discharging roll pair 138 which discharges the recording medium P to the recording medium discharge unit 140 is disposed further to the downstream side in the transport direction than the fixing device 136.

Here, in the image forming apparatus 100 according to the present exemplary embodiment, an image forming operation which forms the image will be described.

In the image recording apparatus 110 according to the present exemplary embodiment, when the image is formed on the recording medium P, first, the recording medium P fed from the recording medium accommodating unit 130 is fed to the secondary transfer position by the transport roll pair 142.

On the other hand, in the intermediate transfer belt 124, the toner image of each color formed by the image forming units 122Y, 122M, 122C, and 122K is overlapped and a color image is formed. Moreover, the color image formed on the intermediate transfer belt 124 is transferred to the recording medium P which is fed to the secondary transfer position.

The recording medium P to which the toner image is transferred is transported to the fixing device 136 and the transferred toner image is fixed by the fixing device 136. The recording medium P on which the toner image is fixed is discharged to the recording medium discharge unit 140 by the discharging roll pair 138. In the manner described above, a series of image forming operations is performed.

Moreover, the configuration of the image recording apparatus 110 is not limited to the above-described configuration. For example, a direct transfer type of image recording apparatus without the intermediate transfer member or an ink jet type of image recording apparatus may be adopted. In addition, image recording apparatus capable of recording the image according to configurations other than above-described configurations may be also adopted.

Next, a configuration of the image reading apparatus 10 according to the present exemplary embodiment will be described. The image reading apparatus 10 according to the present exemplary embodiment may read both documents which are transported and documents which are still.

That is, the image reading apparatus 10 includes a surface reading mechanism 70 which reads the image on the surface of the transported document and the image on the surface of the still document, the automatic document feeder 12 which houses a rear surface reading mechanism 94 which reads the image on the rear surface of the transported document, and a processing device 92 which processes image signals of the image which is read by the surface reading mechanism 70 or the rear surface reading mechanism 94.

First, the surface reading mechanism 70 will be described. The surface reading mechanism 70 is disposed on the lower side of the image reading apparatus 10. The surface reading mechanism 70 includes the first platen glass 72 which is an example of a placement member on which the document of the image to be read in the still state is placed and the second platen glass 74 which is an example of a transmitting member which transmits light radiated to the transported document. In addition, an outer frame section 73 made of a metal is provided at the outside of the peripheral portion of the first platen glass 72 and the second platen glass 74.

Moreover, the surface reading mechanism 70 includes a first moving member 76 and a second moving member 78 which are capable of moving along the first platen glass 72. In the first moving member 76, a light radiating portion 80 which radiates light on the document and a first mirror 82 which receives the light which is reflected by the document are provided. In the second moving member 78, a second mirror 84 and a third mirror 86 which introduce the light obtained from the first mirror 82 are provided.

In addition, the surface reading mechanism 70 includes an imaging lens 88 which optically reduces the optical image obtained from the third mirror 86 and a CCD (Charge Coupled Device) image sensor 90 which optically converts the optical image imaged by the imaging lens 88. Moreover, the image signals which are obtained by the CCD image sensor 90 are sent to the exposure device 116 by the processing device 92.

Here, when the image of the document placed on the first platen glass 72 is read, for example, the first moving member 76 and the second moving member 78 move in a scanning direction (direction of arrow B) by a ratio of 2:1. At this time, the light of the light radiating portion 80 of the first moving member 76 radiates the surface to be read of the document, and the light reflected from the document is reflected at the first mirror 82, the second mirror 84, and the third mirror 86 in the above order and is introduced to the imaging lens 88.

The light introduced to the imaging lens 88 is imaged on a light receiving surface of the CCD image sensor 90. The CCD image sensor 90 is a one-dimensional sensor and simultaneously processes for one line. If the reading for one line in the line direction (fast scanning direction of the scan) ends, the first moving member 76 moves in a direction perpendicular to the fast scanning direction (slow scanning direction) and reads the next line of the document. This is performed over the entire document size, and therefore, the reading of one page of the document is completed.

On the other hand, the document which is transported by the automatic document feeder 12 passes through the second platen glass 74. At this time, the first moving member 76 and the second moving member 78 are stopped at a position of a solid line shown in FIG. 1. First, the reflected light of the first line of the document is imaged on the imaging lens 88 via the first mirror 82, the second mirror 84, and the third mirror 86 and the image is read by the CCD image sensor 90.

That is, after the one line in the fast scanning direction is simultaneously processed by the CCD image sensor 90 which is a one-dimensional sensor, the next line in the fast scanning direction of the document transported by the automatic document feeder 12 is read. That is, after the tip of the document reaches the reading position of the second platen glass 74, the document passes through the reading position of the second platen glass 74. Therefore, the reading of one page of the document over the slow scanning direction is completed.

Figure 2:
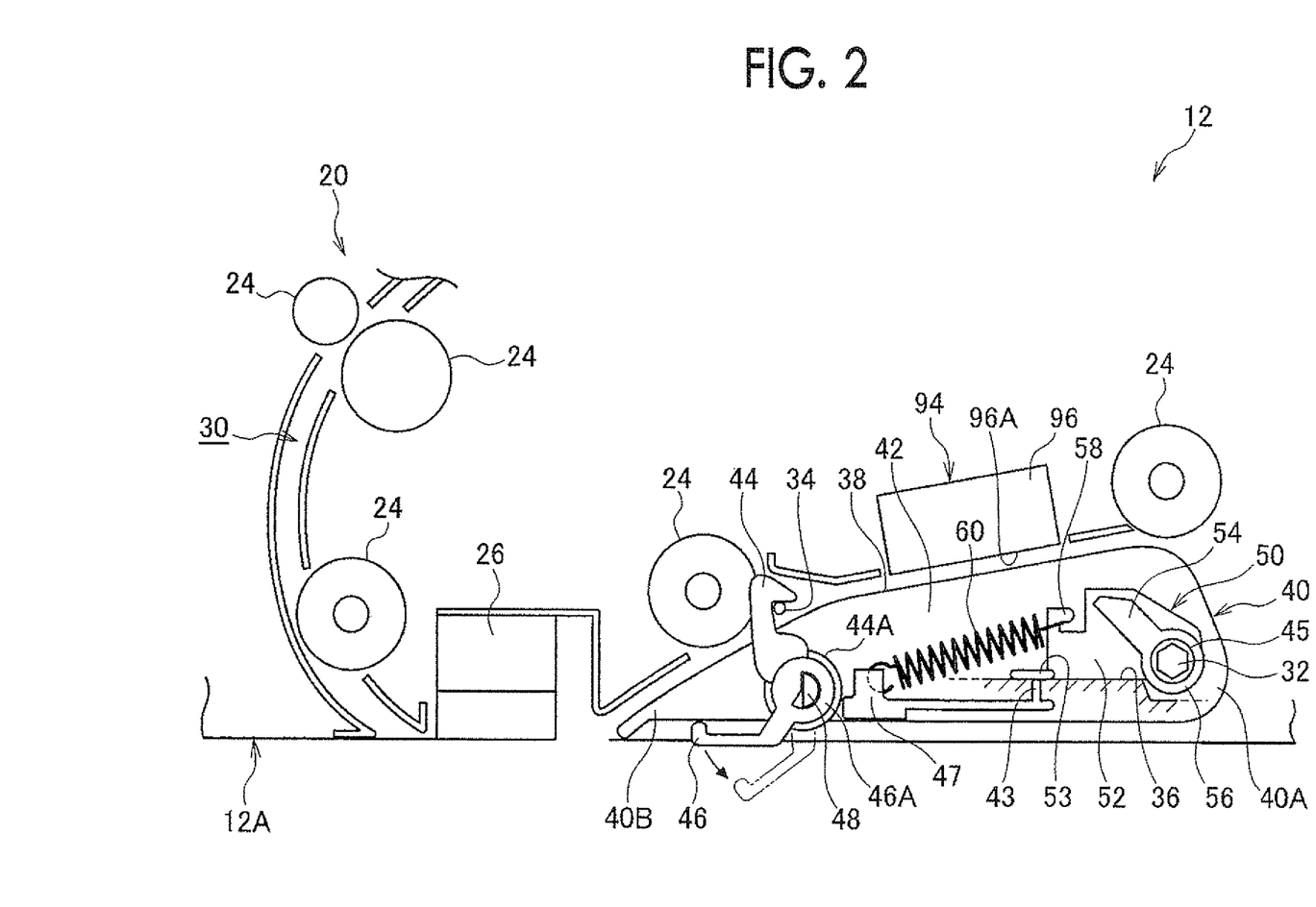
FIG. 2 is a schematic view showing a state where a transport path member of the automatic document feeder according to the present exemplary embodiment is closed.
Figure 3:
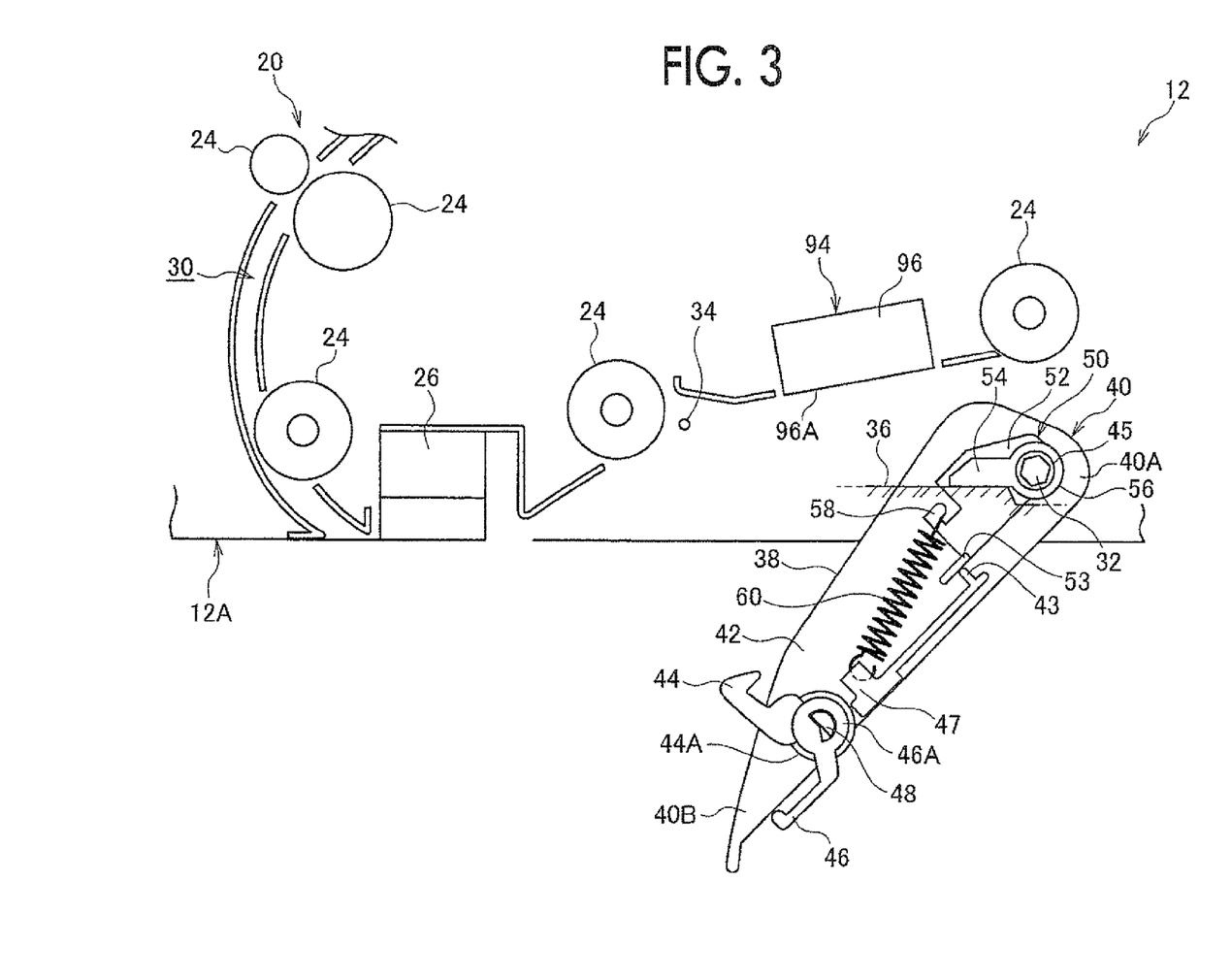
FIG. 3 is a schematic view showing a state where the transport path member of the automatic document feeder according to the present exemplary embodiment is opened.

Next, a configuration of the rear surface reading mechanism 94 will be described. As shown in FIGS. 2 and 3, the rear surface reading mechanism 94 is housed in the automatic document feeder 12 and includes an image sensor 96 which is opposed to a transport path surface 38 of the transport path member 40 described below and is an example of a reading portion having a reading surface 96A which reads the image of (the rear surface of) the document. The image sensor 96 radiates the light from a light emitting portion such as a light emitting diode to the document and receives the reflected light by a receiving portion. Therefore, the image sensor optically reads the image of the document.

Next, a configuration of the automatic document feeder 12 will be described. The automatic document feeder 12 is provided in the upper side of the image reading apparatus 10 and automatically transports the documents so as to be read on the surface reading mechanism 70 and the rear surface reading mechanism 94. Moreover, a hinge portion (not shown) is provided in the internal side of a paper surface of FIG. 1, and the automatic document feeder 12 is configured so that the front side in the paper surface of FIG. 1 moves in the up and down directions with the hinge portion as a supporting point, that is, the first platen glass 72 and the second platen glass 74 are opened and closed.

As shown in FIG. 1, the automatic document feeder 12 includes a document placing table 14 which is an example of a document accommodating portion capable of accommodating and placing the documents, a transport unit 20 which transports the documents placed on the document placing table 14 to a document discharge unit 18 described below, and a document discharge unit 18 to which the documents transporting the transport path 30 in the transport unit 20 are discharged.

A lifting and lowering mechanism 16 which lifts and lowers the document placing table 14 is provided in the document placing table 14. If the document is placed on the document placing table 14, the lifting and lowering mechanism 16 lifts the document placing table 14 up to a position in which the document comes into contact with a feeding roll 22 described below.

The transport unit 20 includes the feeding roll 22 which feeds the documents from the document placing table 14, the transport path 30 in which the documents fed from the document placing table 14 are transported, plural transport rolls 24 which transport the documents along the transport path 30, an opposing member 26 which is disposed so as to be opposed to the second platen glass 74 disposed in the transport path 30, and discharging rolls 28 which discharge the documents to the document discharge unit 18.

In addition, on the lower side which is opposed to the first platen glass 72 and the second platen glass 74 of the automatic document feeder 12, the transport path member 40 which includes the transport path surface 38 configuring a portion of the transport path 30 is provided. As shown in FIGS. 2 and 3, the transport path member 40 is formed in a flat substantially trapezoidal shape in a side view and the upper surface side of the transport path member becomes the transport path surface 38.

In addition, in the transport path member 40, one end 40A side which is the downstream side (discharge rolls 28 side) in the transport direction of the document is supported so as to be rotated at a device body 12A of the automatic document feeder 12. Specifically, a supporting shaft 32 which is provided in the device body 12A is inserted to a through hole (not shown) which is formed on the one end 40A side of the transport path member 40.

Thereby, the other end 40B side of the transport path member 40 is supported so as to move in the up and down directions about the supporting shaft 32 and moves (rotates) in the downward direction which is a direction separated from the device body 12A. Therefore, a portion of the transport path 30 may be opened.

Moreover, among side wall portions in the direction side of the rotating shaft of the transport path member 40, in a side wall portion 42 in an opened side (the front side in the paper surface of FIG. 1) of the automatic document feeder 12, a hook member 44 which is an example of a latching member and a lever member 46 which is an example of an operating member are provided. The hook member 44 and the lever member 46 are mounted on a rotating shaft 48, which is provided so as to be rotated in the other end 40B side being the upstream side in the transport direction of the document in the transport path member 40 and has a D-shaped cross-section, and are rotated in the forward and backward directions.

Specifically, an annular portion 44A in which the inner peripheral portion is formed in a "D" shape substantially similar to the cross-sectional shape of the rotating shaft 48 is integrally formed in the lower end of the hook member 44, and the annular portion 44A is mounted so as to be fitted to the rotating shaft 48. Thereby, the hook member 44 is integrally made with the rotating shaft 48 and is configured so as to be rotated in a clockwise direction and a counterclockwise direction which are shown.

Figure 5:
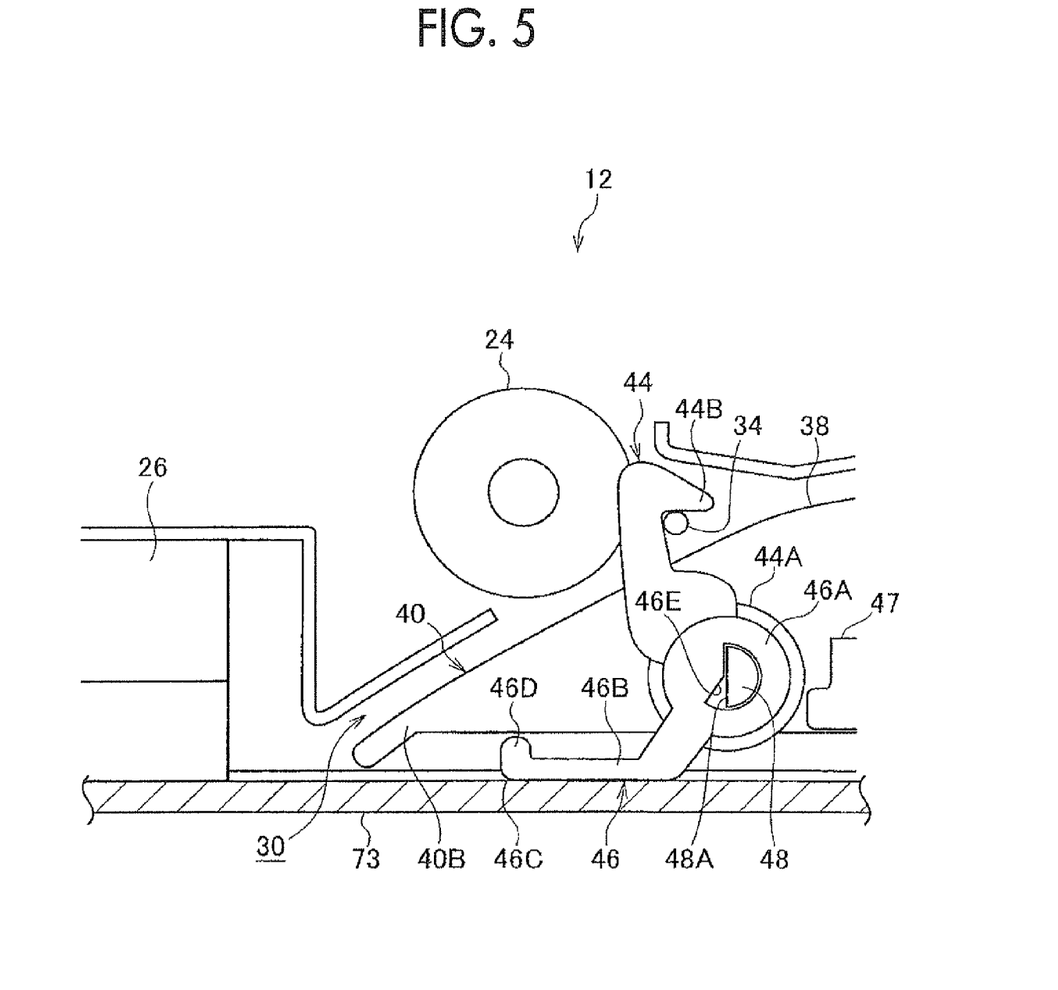
FIG. 5 is a schematic view showing a state of the lever member when the automatic document feeder according to the present exemplary embodiment is closed.
Figure 6:
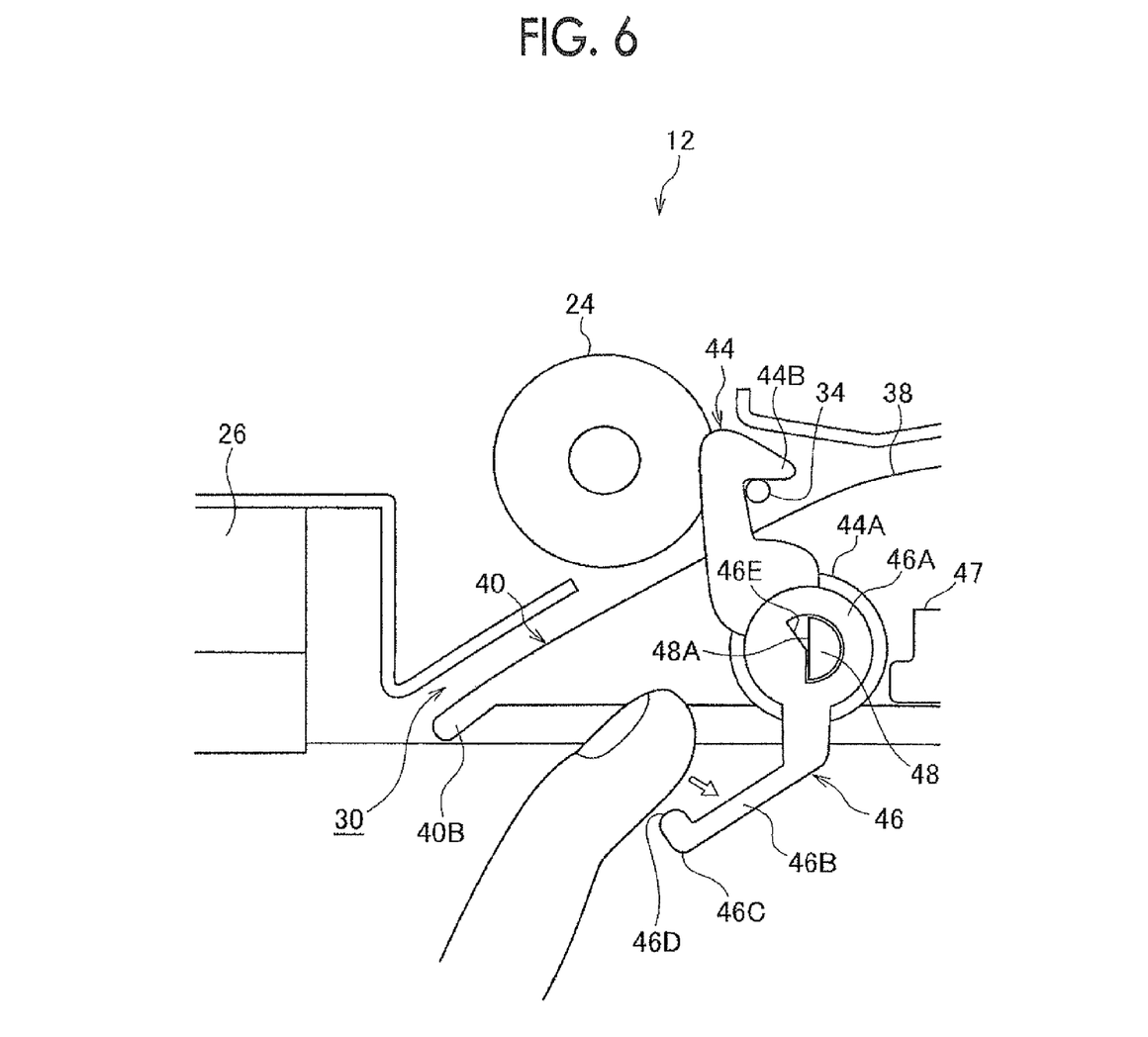
FIG. 6 is a schematic view showing a state of the lever member when the automatic document feeder according to the present exemplary embodiment is opened.

In addition, as shown in FIGS. 5 and 6, an annular portion 46A in which the inner peripheral portion 46E is greater than the cross-section shape of the rotating shaft 48 and has a substantially "D" shape (a shape in which a fan shape having the center angle of an acute angle is added to the "D" shape) is integrally formed in the upper end of the lever member 46, and the annular portion 46A is mounted so as to be fitted to the rotating shaft 48.

That is, the inner peripheral portion 46E of the annular portion 46A is formed in a shape having allowance in the circumferential direction (rotation direction) with respect to the rotating shaft 48 having a D-shaped cross-section, and the lever member 46 is configured so as to rotate the rotating shaft 48 within a range except for the allowance in the circumferential direction (rotation direction).

Moreover, as shown in FIG. 5, when the first platen glass 72 and the second platen glass 74 are closed by the automatic document feeder 12 (the lower surface of the transport path member 40 is not exposed), an arm portion 46B of the lever member 46 is configured so as to come into contact with the upper surface of the outer frame section 73 (is pressed upward relative to the outer frame section 73) and to be stored therein.

Figure 4:
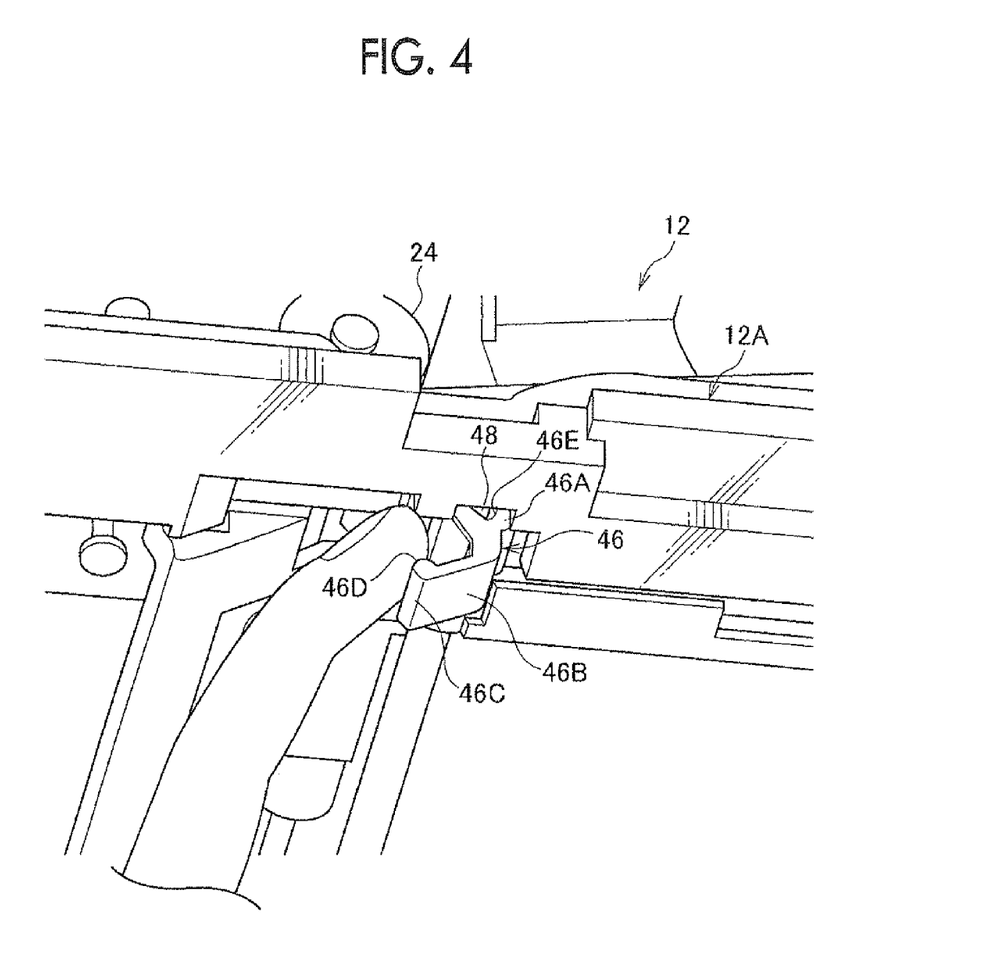
FIG. 4 is a schematic perspective view showing a state of operating a lever member which opens a transport path of the automatic document feeder according to the present exemplary embodiment.

Therefore, as shown in FIGS. 4 to 6, if the automatic document feeder 12 moves upward with the hinge portion as a supporting point (the automatic document feeder moves the exposed position in which the lower surface of the transport path member 40 is exposed), a lower end 46C (refer to FIG. 7) in the arm portion 46B is separated from on the outer frame section 73 while the arm portion 46B of the lever member 46 is rotated (protrudes) downward (direction which is the counterclockwise direction shown and may be referred to as a "second rotation direction") about the rotating shaft 48 by its own weight.

Moreover, as shown in FIG. 6, when a straight portion in the inner peripheral portion 46E of the annular portion 46A of the lever member 46 abuts on a flat surface 48A of the rotating shaft 48 in which the cross-section is formed in a "D" shape, a position in which the downward rotating movement (second rotation direction) of the lever member 46 (arm portion 46B) is regulated becomes an operating position which is operated by a finger.

The hook member 44 is always urged in a direction (direction which is a clockwise direction shown and may be referred to as a "first rotation direction"), in which the hook member 44 is latched to a hook portion 34 which is an example of a latched portion provided in the device body 12A, by an urging member such as a torsion spring (not shown). When the transport path member 40 moves upward and the transport path 30 is closed, the hook member 44 is held in a position (attitude) which is predetermined by a stopper portion (not shown) so that a claw portion 44B formed in the upper end of the hook member 44 gets over the hook portion 34 and is latched.

Therefore, as shown in FIGS. 4 and 6, if the arm portion 46B of the lever member 46, which is rotated downward about the rotating shaft 48 by its own weight and is held to the operating position, is rotated further downward (counterclockwise direction shown and second rotation direction) by a finger, according to the rotation of the lever member 46, the rotating shaft 48 is rotated in the same direction, and the hook member 44 is rotated toward the same direction against the urging force.

Thereby, the claw portion 44B of the hook member 44 is detached from the hook portion 34 and the lock (closed state of transport path 30) of the transport path member 40 is released. That is, according to this, the other end 40B of the transport path member 40 moves downward and the transport path 30 is opened (refer to FIG. 3).

Figure 7:
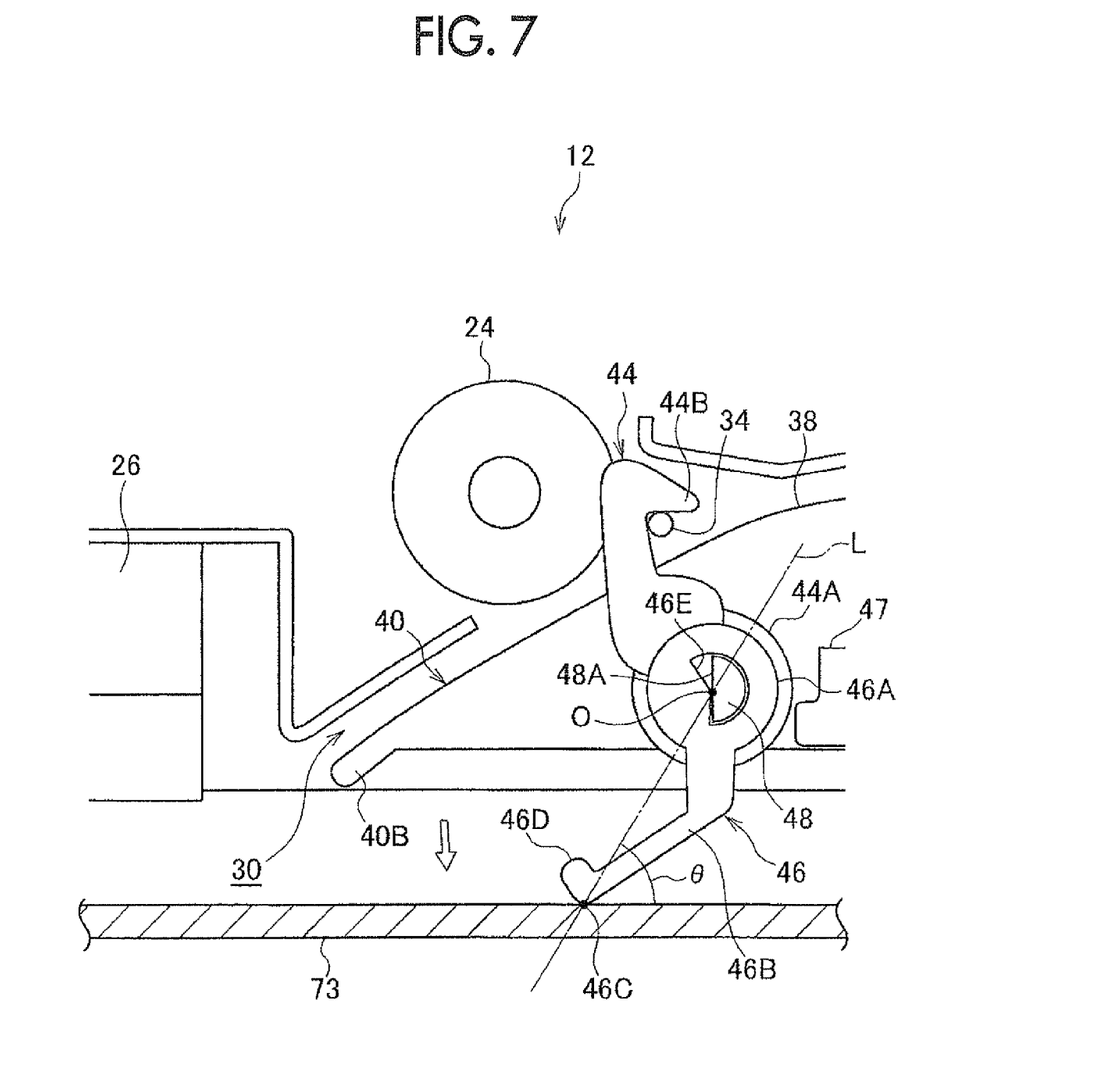
FIG. 7 is a schematic view showing a state of the lever member when the automatic document feeder according to the present exemplary embodiment is closed.

Moreover, as shown in FIG. 7, the height position of the lower end 46C in the arm portion 46B of the lever member 46 at the time of moving downward by its own weight becomes a height position which may be relatively pushed up (is rotated in the first rotation direction) by the outer frame section 73 which the lower end 46C contacts according to the operation which moves the automatic document feeder 12 downward (moves so as to return from the exposed position) with the hinge portion as a supporting point.

Specifically, the shape of the inner peripheral portion 46E of the annular portion 46A is configured with respect to the rotating shaft 48 in which the cross-section is formed in a "D" shape so that an angle θ between a straight line L which connects the lower end 46C when the arm portion 46B of the lever member 46 moves downward by its own weight (portion which initially abuts on the upper surface of the outer frame section 73 when the automatic document feeder 12 moves downward with the hinge portion as a supporting point) and a rotation center O of the lever member 46 and the outer frame section 73 is 60° or less (θ≤60°).

This is because of the following reasons. That is, if the angle θ is greater than 60°, when the automatic document feeder 12 moves downward with the hinge portion as a supporting point, the arm portion 46B of the lever member 46 abuts on the outer frame section 73 and friction force in the direction in which the arm portion rotates in the second direction is excessive, and there is a concern that the automatic document feeder 12 may not close the first platen glass 72 and the second platen glass 74 by the lever member 46.

Moreover, as shown in FIGS. 4 to 7, a bulging portion 46D which bulges in a substantially semicircular arc shape in a side view is integrally formed in a wall portion vertically opposed to the lower end 46C of the arm portion 46B of the lever member 46 so that a finger is easily hooked and the finger does not easily slip.

In addition, a finger is not easily inserted to a side wall portion (not shown) of a side opposed to the side wall portion 42 of the transport path member 40 in the hinge portion side of the automatic document feeder 12 (the internal side of the paper surface of FIG. 1). Therefore, in the side wall portion opposed to the side wall portion 42, only the hook member 44 which is always urged in the direction of being latched to the hook portion 34 and is detached from the hook portion 34 in conjunction with the hook member 44 of the side wall portion 42 side by the rotation of the lever member 46 is provided and the lever member 46 is not provided.

Moreover, as shown in FIGS. 2 and 3, in the side wall portion 42 of the transport path member 40, a link member 50, which is an example of a support member including a locked portion 54 which abuts on the locking portion 36 of the device body 12A and regulates the movement when the other end 40B side of the transport path member 40 moves downward about the supporting shaft 32, is provided.

The link member 50 is configured so as to include a base portion 52 having a thin plate shape and the locked portion 54 which is integrally formed in the thickness direction of the base portion 52 and has a thick plate shape, and the link member is coaxial with the transport path member 40 and may relatively rotate. Specifically, an annular portion 56 is formed in one end side of the link member 50, and the annular portion 56 is fitted and mounted so as to be relatively rotated in a cylindrical boss portion 45 which protrudes around the through hole of the transport path member 40.

Moreover, in the base portion 52 of the link member 50, an attaching portion 58 having a hook shape is formed in the other end side which is a side opposed to the annular portion 56. One end of a coil spring 60 which is an example of an urging member is mounted on the attaching portion 58 and the other end of the coil spring 60 is mounted on the other end 40B side in the side wall portion 42 of the transport path member 40, that is, an attaching portion 47 which is provided in a position adjacent to the rotating shaft 48.

By the coil spring 60, a protrusion 43 described below is always urged in a direction (clockwise direction shown) in which the protrusion comes into contact with a stopper portion 53 described below. That is, the stopper portion 53 which is an example of a regulating portion protruding in a flat plate shape in the thickness direction is formed at a portion just below the attaching portion 58 of the link member 50 (base portion 52).

Moreover, in the side wall portion 42 of the transport path member 40, the protrusion 43, which is an example of a regulated portion which is urged in a clockwise direction shown by the coil spring 60 and contacts (abuts on) the stopper portion 53, is formed. The protrusion 43 is formed in a rib shape which vertically abuts on (line-contacts) the stopper portion 53, and the relative rotation in the direction in which the other end 40B side of the transport path member 40 approaches the device body 12A is regulated by the protrusion 43.

That is, as shown in FIG. 3, when the other end 40B side of the transport path member 40 moves downward about the supporting shaft 32, the locked portion 54 abuts on the locking portion 36, and the position of the link member 50 is regulated, the protrusion 43 contacts (abuts on) the stopper portion 53 due to the urging force of the coil spring 60. Therefore, the movement in the direction in which the other end 40B side of the transport path member 40 approaches the device body 12A is regulated. Thereby, the other end 40B side of the transport path member 40 is configured so as to be supported in the opened position.

Next, operation of the automatic document feeder 12 which includes the transport path member 40 having the above-described configuration will be described. If the document is placed on the document placing table 14 and the image forming apparatus 100 is operated, the document is transported by the automatic document feeder 12.

That is, the document of the document placing table 14 is fed to the transport path 30 by the feeding roll 22 and the document fed to the transport path 30 is transported on the transport path 30 by plural transport rolls 24. In addition, the image recorded on the surface of the document passes through the second platen glass 74, and therefore, the image is read by the surface reading mechanism 70.

Moreover, at the case where the image recorded on the rear surface of the document is read, when the document is transported on the transport path surface 38, the image of the rear surface is read by the rear surface reading mechanism 94. In this way, the document in which the image of at least the surface is read is discharged to the document discharge unit 18 by the discharge rolls 28.

Here, when the document is accumulated on the transport path surface 38 (a so-called jam occurs), the front side of the automatic document feeder 12 is lifted upward with the hinge portion in the inner side as a supporting point. Thereby, since the lever member 46 which opens the transport path 30 (release lock of the transport path member 40) has the allowance in the circumferential direction with respect to the rotating shaft 48, the arm portion 46B is separated from the outer frame section 73 while rotating downward (second direction) by its own weight. Thereby, the arm portion 463 of the lever member 46 is held in the operation position in which the arm portion protrudes downward from the device body 12A (refer to FIGS. 4 and 6).

Therefore, even in the case of the automatic document feeder 12 including the configuration in which the rear surface reading mechanism 94 is housed and a gap between the arm portion 46B of the lever member 46 and the device body 12A is not easily formed (a space to which a finger is inserted is not easily secured due to miniaturization), a finger is easily inserted between the arm portion 46B and the device body 12A and a finger is easily hooked to the bulging portion 46D of the arm portion 46B. Thus, operability with respect to the lever member 46 may be improved when the transport path 30 is opened.

Moreover, if the arm portion 46B of the lever member 46 is rotated downward by its own weight (is held to the operating position), as shown in FIGS. 4 and 6, a finger is hooked to the bulging portion 46D and the arm portion 46B is rotated further downward (second direction). Thereby, the rotating shaft 48 is rotated in the same direction, and the hook member 44 which is integrated to the rotating shaft is rotated in the same direction against the urging force. Therefore, the claw portions 44B of the pair of hook members 44 are detached from the hook portion 34 and the lock of the transport path member 40 is released.

That is, as shown in FIG. 3, the other end 40B side of the transport path member 40 moves downward with the supporting shaft 32 in the one end 40A side as the center of rotation by its own weight and the transport path 30 (transport path surface 38) is opened. Moreover, at this time, the locked portion 54 of the link member 50 abuts on the locking portion 36 of the device body 12A and the downward movement of the other end 40B side of the transport path member 40 is regulated.

In addition, the link member 50 including the locked portion 54 locked to the locking portion 36 supports the other end 40B side of the transport member 40 via the coil spring 60, that is, due to the fact that the protrusion 43 abuts on the stopper portion 53 due to the urging force of the coil spring 60. Thereby, the other end 40B side of the transport path member 40 is supported to the opened position shown in FIG. 3 and the document accumulated on the transport path surface 38 may be removed.

On the other hand, when the transport path 30 (transport path surface 38) is closed by the transport path member 40, the other end 40B side of the transport path member 40 is manually moved upward. Thereby, the pair of hook members 44 (claw portions 443) is always urged to the direction which is latched to the hook portion 34, gets over the hook portion 34, and is held to an attitude (position) capable of being latched to the hook portion. Therefore, the hook members 44 are automatically latched to the hook portion 34. Thereby, the transport path member 40 is held to the state which closes the transport path 30.

Moreover, if the automatic document feeder 12 moves downward with the hinge portion as a supporting point (first platen glass 72 and second platen glass 74 are closed), the lower end 46C of the lever member 46 abuts on the outer frame section 73, the arm portion 463 is relatively pressed upward (external force is added) according to the downward movement of the lower end 46C and is rotated in the first rotation direction.

Here, the angle θ between the straight line L which connects the lower end 46C of the lever member 46 and the rotation center O and the outer frame section 73 is 60° or less. Therefore, according to the downward movement of the automatic document feeder 12 having the hinge portion as a supporting point, a disadvantage in which the arm portion 463 of the lever member 46 abuts on the outer frame section 73 and stands does not occur, and the arm portion 46B is relatively pressed upward by the outer frame section 73 and is automatically held to the position shown in FIG. 5 (is easily stored).

Figure 8:
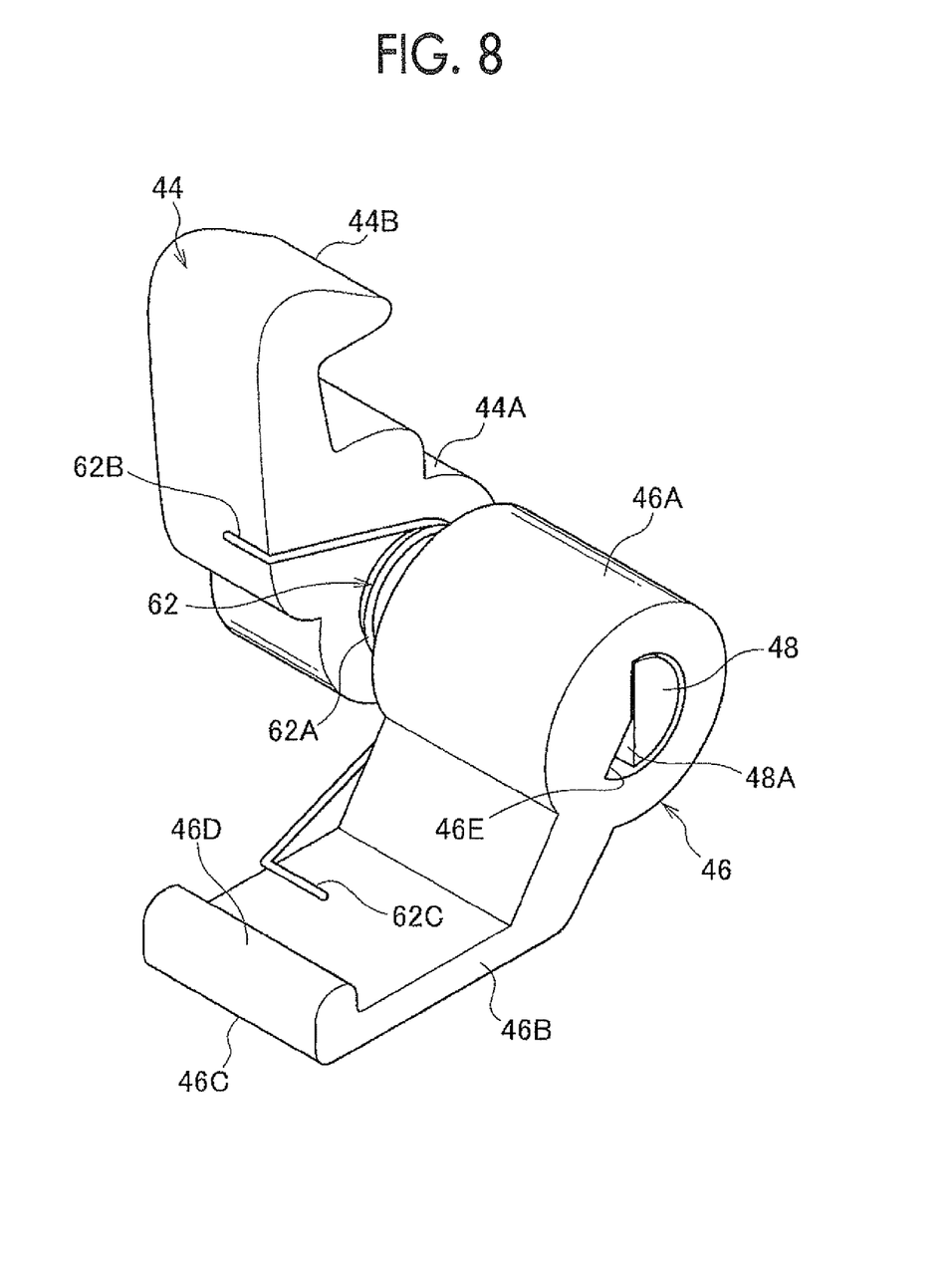
FIG. 8 is a schematic perspective view showing a configuration of the lever member of the automatic document feeder according to the present exemplary embodiment.
Figure 9:
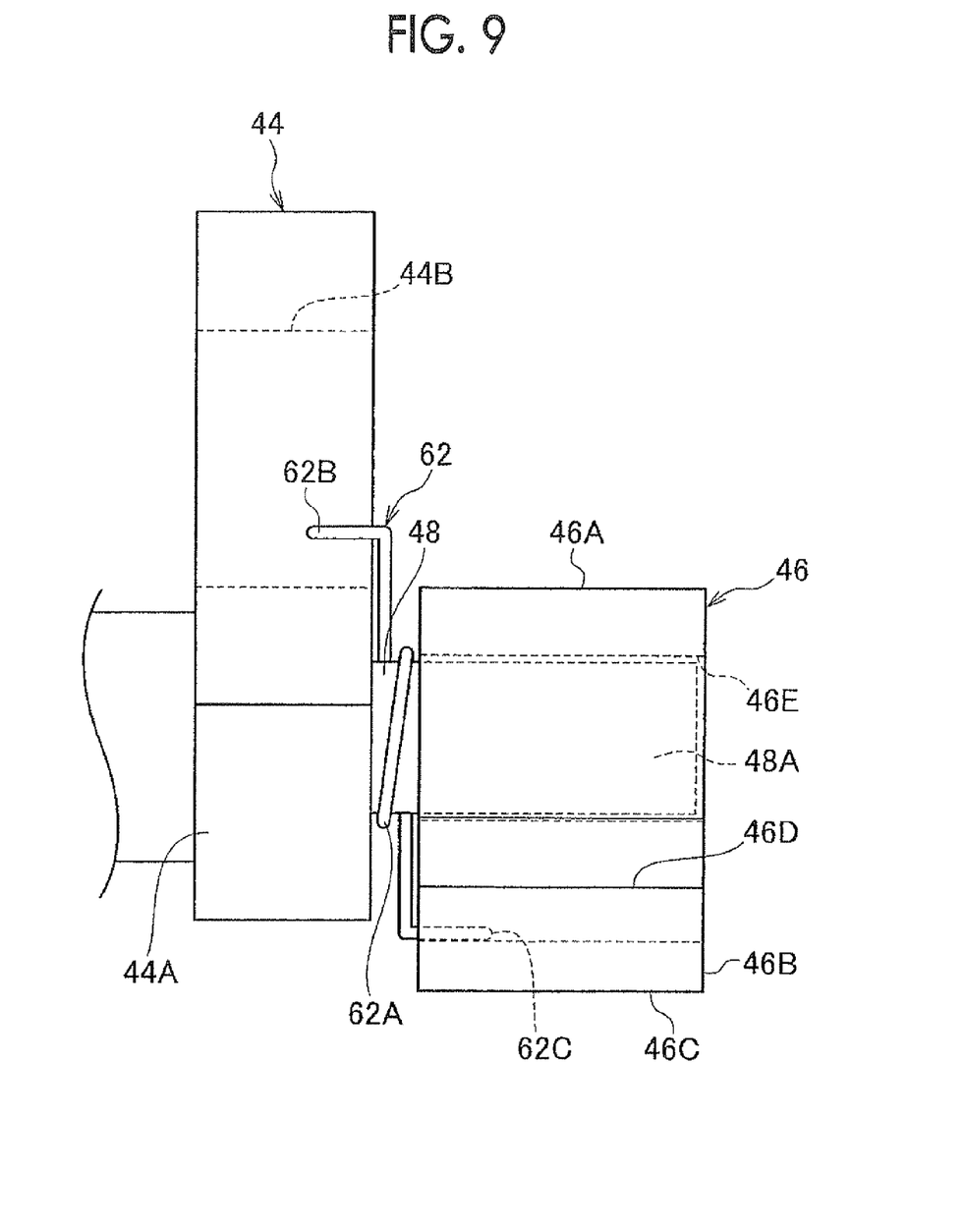
FIG. 9 is a schematic front view showing a configuration of the lever member of the automatic document feeder according to the present exemplary embodiment.

Moreover, as shown in FIGS. 8 and 9, a torsion spring 62 which is an example of an urging member may be disposed in the rotating shaft 48 between the hook member 44 and the lever member 46. That is, according to the upward movement of the automatic document feeder 12 with the hinge portion as a supporting point, the lower end 46C may be configured so as to be separated from on the outer frame section 73 while the arm portion 46B of the lever member 46 is forcibly rotated (protrudes) downward due to the urging force of the torsion spring 62.

Specifically, a coil portion 62A of the torsion spring 62 is fitted to the rotating shaft 48, and one end portion 62B of the torsion spring 62 is latched to the hook member 44 so the claw portion 44B is urged in the first rotation direction. Moreover, the other end 62C of the torsion spring 62 is latched to the lever member 46 so that the arm portion 46B is urged in the second rotation direction.

Thereby, even in a configuration in which the arm portion 46B of the lever member 46 is not easily rotated downward by its own weight (for example, a configuration in which the center of gravity of the lever member 46 is disposed closer to the rotation center side), the arm portion 46B may be forcibly rotated downward (up to the operating position). Therefore, similarly to the above, a finger is easily inserted between the arm portion 46B and the device body 12A, and operability with respect to the lever member 46 may be improved when the transport path 30 is opened.

Moreover, the arm portion 463 of the lever member 46 according to the present exemplary embodiment is configured so as to always contact the outer frame section 73 made of a metal when the automatic document feeder 12 closes the first platen glass 72 and the second platen glass 74. Therefore, if the lever member 46 is molded in a conductive resin material or a metal material, the lever member 46 may be used as a grounding section (earth) of the automatic document feeder 12.

As described above, the automatic document feeder 12 according to the present exemplary embodiment is described with reference to drawings. However, the automatic document feeder 12 according to the present exemplary embodiment is not limited to those shown and various modifications, changes, and improvements may be performed.

For example, the present invention is not limited to the configuration in which link member 50 and the coil spring 60 are provided in only the side wall portion 42 of the transport path member 40. That is, the link member 50 and the coil spring 60 may be provided in the side wall portion opposed to the side wall portion 42. Moreover, the surface reading mechanism 70 and the rear surface reading mechanism 94 are not limited to the above-described configuration. That is, according to those other than the above-described configuration, the image of the document may be read.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An automatic document feeder comprising:
   a transport path member that includes a transport path surface configuring a transport path in which a document is transported in a device body, of which one end side is supported so as to rotate in the device body and the other end side moves in a direction separated from the device body to open the transport path;
   a latching member that is mounted on a rotating shaft provided in the other end side of the transport path member, is urged in a first rotation direction latched to a latched portion of the device body, and holds the transport path member in a closed state of the transport path by being latched to the latched portion, and is engaged to the latched portion when the transport path member is not exposed; and
   an operating member that is rotated down to an operating position by own weight thereof or urging force in a second rotation direction opposed to the first rotation direction when the device body moves to an exposed position in which the transport path member is exposed, and the transport path member is in a closed state of the transport path by being latched to the latched portion, and is mounted with allowance in a circumferential direction of the rotating shaft so that the latching member is rotated in the second rotation direction according to a further rotating operation in the second rotation direction from the operating position and the latching member is detached from the latched portion.

2. The automatic document feeder according to claim 1, wherein the operating member that is rotated down to the operating position by own weight thereof or the urging force is rotated in the first rotation direction by adding relative external force toward the device body when the device body moves so as to return from the exposed position.

3. The automatic document feeder according to claim 1, wherein
   the operating member that is rotated downward away from the transport path surface to the operating position where an upper surface of the operating member is exposed, the operating member being rotated by own weight thereof or urging force in the second rotation direction opposed to the first rotation direction when the device body moves to the exposed position in which the transport path member is exposed, and the transport path member is in the closed state of the transport path by being latched to the latched portion, and is mounted with allowance in the circumferential direction of the rotating shaft so that the latching member is rotated in the second rotation direction according to the further rotating operation in the second rotation direction from the operating position and the latching member is detached from the latched portion.

* * * * *